(12) United States Patent
Howald

(10) Patent No.: US 7,759,631 B2
(45) Date of Patent: Jul. 20, 2010

(54) RASTER SCANNING MICROSCOPE HAVING TRANSPARENT OPTICAL ELEMENT WITH INNER CURVED SURFACE

(75) Inventor: Lukas E. Howald, Dornach (CH)

(73) Assignee: Nanosurf AG, Liestal (CH)

( * ) Notice: Subject to any disclaimer, the term of this patent is extended or adjusted under 35 U.S.C. 154(b) by 0 days.

(21) Appl. No.: 12/017,623

(22) Filed: Jan. 22, 2008

(65) Prior Publication Data

US 2009/0184242 A1 Jul. 23, 2009

(51) Int. Cl.
*H01J 3/14* (2006.01)
*G01N 23/00* (2006.01)
*G01B 5/28* (2006.01)
*G02B 21/00* (2006.01)

(52) U.S. Cl. .................. 250/216; 250/306; 73/105; 359/368

(58) Field of Classification Search ............... 250/216, 250/234, 306–311; 73/105; 359/368
See application file for complete search history.

(56) References Cited

U.S. PATENT DOCUMENTS

| RE34,489 E | 12/1993 | Hansma et al. |
| 5,291,775 A | 3/1994 | Gamble et al. |
| 5,294,804 A * | 3/1994 | Kajimura ............... 250/559.31 |
| 5,319,960 A | 6/1994 | Gamble et al. |
| 5,517,360 A | 5/1996 | Suzuki |
| 5,805,346 A | 9/1998 | Tomimatsu |
| 5,821,409 A | 10/1998 | Honma et al. |
| 6,396,580 B1 | 5/2002 | Tewes et al. |
| 6,583,444 B2 * | 6/2003 | Fjelstad .................. 257/82 |
| 7,262,922 B2 | 8/2007 | Yamaguchi |

FOREIGN PATENT DOCUMENTS

| EP | 388 023 | 2/1990 |
| EP | 564 088 | 2/1993 |
| EP | 1 004 014 | 2/1999 |
| JP | 2000058436 A * | 2/2000 |
| WO | 98/10458 | 3/1998 |

* cited by examiner

*Primary Examiner*—Thanh X Luu
(74) *Attorney, Agent, or Firm*—Renner, Otto, Boisselle & Sklar, LLP

(57) ABSTRACT

The optical detection system typically used in micromechanical cantilever-based instruments, e.g. scanning probe microscopes, chemical or biological sensing probes like "artificial noses", or molecular force probe instruments, can hardly cope when measuring samples immersed in a fluid, i.e. a gas, gel, or liquid having another refractive index than the environment. Optical readout or detection becomes problematic as soon as the refractive index of the fluid changes, because signals can shift significantly. The invention provides an improved optical means at the interface between the fluid and the environment, avoiding signal shifts, and thus avoiding time-consuming and difficult re-calibration or re-adjustment of the microscope or other cantilever-based instrument.

20 Claims, 5 Drawing Sheets

RASTER SCANNING MICROSCOPE HAVING TRANSPARENT OPTICAL ELEMENT WITH INNER CURVED SURFACE

TECHNICAL FIELD OF THE INVENTION

The present invention concerns an improvement for the optical detection system used typically within micromechanical cantilever-based instruments. In such instruments, one or more micromechanical cantilevers whose deflection or movement, e.g. oscillation, is often detected or read out optically. Such cantilevers are used for investigating materials in various applications, particularly interesting applications being scanning probe microscopes (SPMs) like atomic force microscopes (AFMs), chemical or biological sensing probes like "artificial noses", or molecular force probe instruments, etc. Lately, science has become very interested in investigating probes or samples in a fluid, i.e liquid, gel or gas, or even samples whose environment must be changed during or between measurements. Optical readout or detection becomes problematic when the measurement environment of the sample changes from a first fluid to a second fluid with a different refractive index. This problem is intensified especially when the fluid must be changed in a measurement cycle. The typical solution is a time-consuming and difficult re-calibration or re-adjustment of the microscope or other device. The present invention provides a far better solution to this problem by an improved design of the optical detection means, avoiding any necessity for re-adjustment in the above described cases.

BACKGROUND AND PRIOR ART

In scanning probe microscopy, i.e. atomic force microscopy, as in other micromechnical cantilever applications, optical detection of the static deflection or the movements or oscillations of the cantilever has become a kind of standard for many applications. There are numerous devices using this kind of readout marketed by various manufacturers, one of them being a scanning probe microscope sold under the name "easyScan" by the assignee of this patent application.

Science has become interested in investigating materials in fluids, e.g. investigating biological samples like cells or fibers in various gaseous and/or liquid environments, using either scanning probe microscopes or other cantilever-based devices with an optical readout. This is usually accomplished by placing the sample and the scanning cantilever in a small vessel filled, at least to some extent, with the liquid or fluid in which the sample is to be investigated.

EP application 388 023 and U.S. Pat. No. RE 34,489 by P. K. Hansma et. al describe an AFM with a replaceable sample-carrying module which includes a provision for forming a fluid cell around the sample. The readout—or "positional sensing" as it is named in the subject patent/application—is shown as an optical system located outside the module. The module is factory set up, but must be fine tuned by the user. It is not mentioned which effect a change of the refractive index of the fluid within the module on the fine tuning has, but basic optical principles indicate that the fine tuning must also balance any change of the refractive index of the fluid surrounding the sample.

EP application 564 088 and U.S. Pat. No. 5,821,409 by K. Honma et al. describe a combined near field optical/AFM microscope whose sample is immersed in a liquid and both optically observed and cantilever-scanned. Though Honma et al. show quite a number of optical elements in their device, both for observation and scanning, nothing is said about the effect of the refractive indices of the fluids used.

U.S. Pat. No. 5,319,960 by Gamble et al. discloses an AFM capable of scanning a sample in contact with a fluid. However, the description of the optical detector system therein does not address any implications based on measuring in a liquid.

Similarly, U.S. Pat. No. 5,291,775 by Gamble et al. discloses another "scanning force microscope" with integrated optics, capable of measuring a sample in a fluid cell. Again, the fact that a fluid changes the properties of the optical path is nowhere addressed.

International application WO 98/10458 by P. K. Hansma et al. shows a further AFM with a complex optical readout system, generating a well-defined beam spot on the cantilever for measuring the deflection of the latter. Though it is described that the sample may be immersed in a fluid, e.g. water, the matter of a changed refractive index of the fluid used is not addressed.

EP Patent Specification 1 004 014 and U.S. Pat. No. 6,396,580 by Tewes et al. discloses an apparatus for fluorescence correlation spectroscopy, in particular for multi-color fluorescence correlation spectroscopy, in which apparatus light beams of different frequencies have to be focused in a transparent medium. To avoid any errors introduced by refractive optics, it provides a reflective optical system within the transparent medium for focussing the incident light beam. Though the disclosed system addresses some of the issues occurring when fluids having different refractive indices are changed within an optical beam path, the disclosed solution of a reflector within a probe chamber seems hardly adaptable to any of the typical cantilever-based SPMs. The reason is that in the latter the cantilever would intersect the incident light beam and the focusing would occur on the wrong side of the cantilever.

One specific characteristic is common to all prior art disclosures above: they use a planar interface in the optical path for entering or exiting the probe chamber.

In a different technology, i.e. the technology of optical immersion microscopes, lenses with a concave surface facing an immersion liquid are known. However, as shown in U.S. Pat. No. 5,517,360 by Suzuki and U.S. Pat. No. 5,805,346 by Tomimatso, both addressing immersion microscope objectives, the disclosed objectives are extremely complex designs, consisting of ten or more lenses with detailed specifications. The issue of changing refractive indices of the immersion fluid is not addressed. The lenses closest to the object are shown as "positive" meniscus lenses, i.e. converging lenses, having a concave surface facing this object and contacting the liquid. The radius of this surface determined by the refractive indices of the various materials used for the many parts of the objective—it is not related to and differs from the distance to the object or to a desired focal point. Contrary to the above, as will be shown and explained below, the meniscus lens according to one embodiment of the present invention is a "neutral" lens, the radius of its inner surface being dependent on the distance to a desired focal point.

The same is true, mutatis mutandis, for the immersion microscope objective disclosed in U.S. Pat. No. 7,262,922 by Yamaguchi. In this patent, the lens closest to the object is described as exhibiting a positive refraction and having a radius of greater than 1 up to 50 times the focal length of the objective. Both conditions or measures differ from the rules give for the "neutral" meniscus lens according to one embodiment of the present invention.

Reverting back to SPM and the like, the point is that whenever an optical system outside the fluid-filled probe chamber or just outside the fluid is used and the fluid's refractive index changes, the optical paths change between the light source and the cantilever as well as between the cantilever and the optical receiver. This usually needs a re-adjustment of the optical system.

It seems that the issue of re-adjustment and/or re-calibration was not recognized or it was considered immaterial or not sufficiently important in a scientific environment.

There are two significant points to understand in this respect whenever the refractive index of the fluid within a probe chamber changes.

(1) Assumed that an incident beam, typically a cone, enters the probe chamber perpendicularly, usually through a window of a transparent material, and is focused correctly onto a cantilever in a first fluid. Now, when the first fluid is replaced by a second fluid with a different refractive index, the beam path remains essentially unaffected, but not the beam's focus on the cantilever, better: the beam will not focus any more on the same spot (in the same plane) as previously. Depending on the overall design of the detection system, the same may be true, mutatis mutandis, for the reflected beam when it leaves the chamber perpendicularly, passing the chamber wall again through a window of a transparent material: its focal plane shifts whenever the refractive index of the fluid within the chamber changes. In this case, the detector receiving the reflected beam will in most cases provide a different output.

(2) It becomes worse when the incident beam enters the probe chamber under an angle or the reflected beam leaves the probe chamber under an angle, i.e. passes the chamber walls not perpendicularly. In this case, both the incident and the reflected beams will follow another path a soon as the refractive index of the fluid within the chamber changes. Thus the incident beam may not be lined up with the cantilever any more or the reflected beam may not hit the detector—or both.

It seems that until now, re-adjustment and/or re-calibration were considered the only solutions to this problem in scanning probe microscopy. Though this may be acceptable in a test or laboratory environment, it is certainly not acceptable in an industrial or manufacturing environment. Also, it makes measurements whereby the fluid is to be changed under way, i.e. during the measurement, practically impossible.

THE INVENTION

As already indicated above, it is the main object of the invention to create an improved optical readout system for cantilever-based instruments, overcoming the shortcomings of existing systems.

It is a further object to limit or even avoid any re-adjustment or re-calibration of the optical system within an SPM or other cantilever-based instrument when measurements in fluids are carried out.

It is a still further object to allow measurements with an optical system in an SPM and other cantilever-based instrument "on the run", i.e. taking place when the fluid surrounding the sample and/or the cantilever is changed or even during the change.

The invention meets these and further objects by an optical design which may be summarized as follows.

All rays of the incident beam, produced by a laser or other, not necessarily monochromatic, source of radiation must pass the interface between fluid and a necessarily transparent wall element, perpendicularly or within a small angle, preferably less than 1°. This angular tolerance is given by the overall design of the optical system, especially by the design of the light path between source and the point of desired impact of the beam, in most cantilever-based instruments usually the upper side of the cantilever. The allowable deviation from the perpendicular also depends on the required precision or accuracy of the measured values; it might even be desirable to have a very small deviation from the perpendicular.

The solution according to the invention is to design the transparent wall element to comprise or consist of an at least partly transparent optical element, e.g. a lens, with an especially formed optical surface at least at its interface contacting the fluid. Preferably, the form of this inner surface is cylindrical or spherical with its center of curvature located at the point or line of desired focus (which usually, but not necessarily, is the point of beam impact).

As mentioned, the inner surface of the optical element can have two basic forms: if a focal point is desired, the inner surface must have the form of a spherical segment or calotte. If a focal line is desired or if path deviations just in one dimension are to be avoided, the inner surface must have the form of a cylindrical segment.

The outside surface of the optical element in the probe chamber wall may also be curved, in addition to the curved inner surface. Here, the same basic principles apply as explained above regarding the possible forms of the inner surface.

If both surfaces are shaped as described, the resulting element is a meniscus lens with a common center of curvatures for the two surfaces. For any ray which aims at that center of curvature and passes the two optical surfaces, there occurs no refraction at all. This means that the geometrical propagation of the rays becomes independent of the refractive indices of the media. It becomes also independent of the wavelength of the light.

Whereas the separating wall itself may be designed and/or machined to form the optical element with the desired inner and/or outer surface, it may be advantageous to insert a separately designed and manufactured lens into the wall. This may be a practical way in case a concave-convex (meniscus lens) or other rather complex lens design is to be used.

It may also be advantageous to use separate optical elements, a first one for the incident beam and a second one for the reflected beam. These two optical elements need not necessarily be identical, e.g. one may be a plane/concave lens and the other one a meniscus lens as described above. Also, if the probe chamber contains more than one cantilever which has to be read out, it may even be necessary to provide more than two optical elements. In the latter case, however, a cylindrical lens design might also be a viable solution.

A typical design according to the invention may include a probe chamber containing the fluid, the chamber having one or more inserted optical elements. However, the cantilever may also be immersed in just a drop of a liquid without any probe chamber, using the liquid's surface tension as "chamber" to keep the drop together, immersing the cantilever. Then, the optical element (or each element) will be arranged to touch the drop so that its inner surface is wetted by the liquid.

When changing the fluid from a gaseous to a liquid medium, care should be taken in order to avoid remaining gas bubbles in the cavity of the interface. This can easily be achieved by controlling the wetting properties of the surface and/or by introducing a geometrical set-up which facilitates venting of the cavity.

DESCRIPTION OF EMBODIMENTS

Below, embodiments of the invention are described in conjunction with the drawings, as follows:

FIG. 1 shows a typical AFM in which the present invention may be used whenever samples in fluids are to be investigated or measured.

Figure 1:
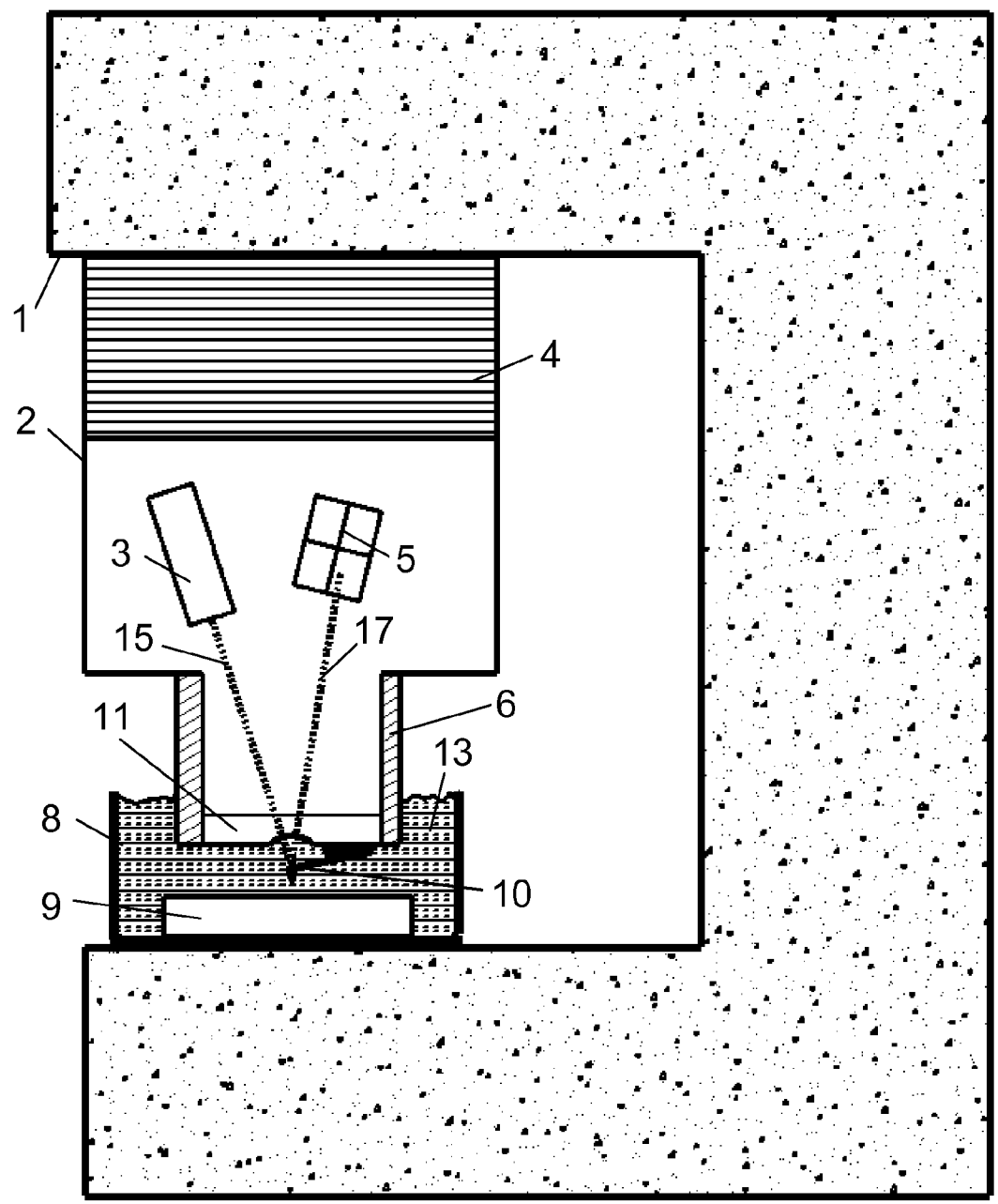
FIG. 1 is an overall view of a typical AFM.

The stationary body 1 of the AFM is shown schematically only; only the parts important for the present invention are depicted in some detail. Housing 2 comprises the optical arrangement consisting of a laser 3 and a receiver or sensor diode 5, the latter being e.g. a four-quadrant diode. An x-y-z positioning device 4 can move housing 2 in three dimensions as known in the AFM art. A tube-like extension 6 of housing 2 reaches into fluid 13 which fills probe chamber 8. The bottom end of extension 6 is closed by a transparent optical element 11 which provides the separating element between the fluid 13 and the inside of housing 2. The latter is usually air-filled.

Sample 9 which is to be investigated is located at the bottom of probe chamber 8, immersed in fluid 13. Also immersed in fluid 13 is cantilever 10, its tip being very close to or even touching sample 9, as usual in AFMs, depending on the particular mode of operation.

The optical system consisting of laser 3, sensor 5 and transparent element 11 is fixed within housing 2 and housing extension 6, respectively.

Laser 3 sends an incident beam 15 through transparent element 11 onto cantilever 10. The beam is reflected from cantilever 10, travelling again through transparent element 11 and hitting sensor 5 as reflected beam 17. The readout and other associated circuitry are not shown in the figure; these are known to a person skilled in the art.

Figure 2A:
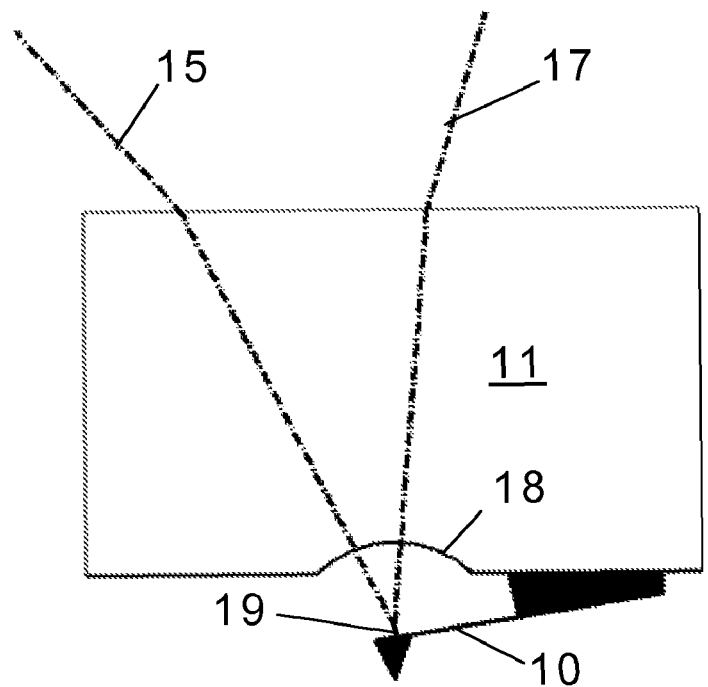
FIGS. 2a, 2b show details of the optical path in a probe chamber.
Figure 2B:
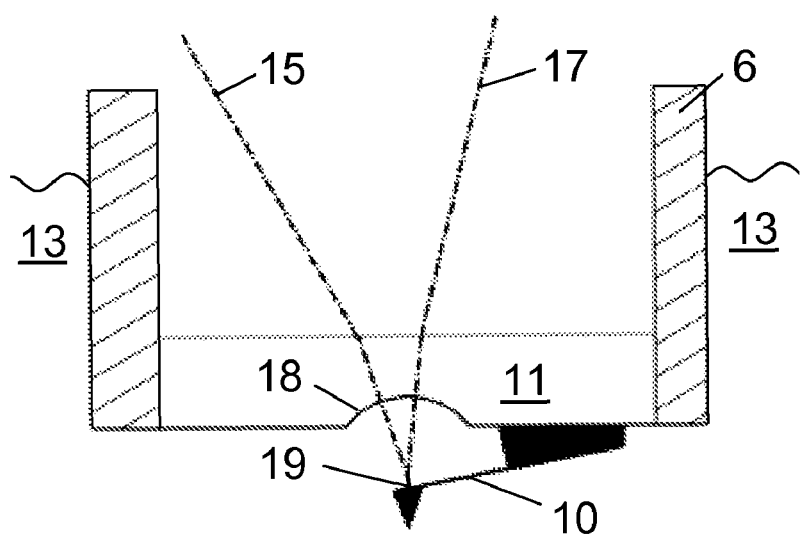

FIGS. 2a and 2b show details of the apparatus depicted in FIG. 1, namely the significant part of the optical path, including the transparent optical element and the cantilever.

In FIGS. 2a and 2b, optical element 11 is made of a transparent material, e.g. glass or acrylic glass or other clear transparent material. Its upper surface, i.e. the surface in contact with air (see FIG. 1) is plane. Depending on the ratio of the refractive index of air (or another gas or fluid provided above the upper surface of optical element 11) and the refractive index of the material of optical element 11, incident ray 15 is refracted. Since usually the refractive index of optical element 11 will be the greater one, incident ray 15 is refracted as shown in the two figures.

Whereas the upper surface of optical element 11 is shown as being plane in FIGS. 2a and 2b, the lower surface of optical element 11 exhibits a (concave) indentation 18 which extends over part or the full lower surface.

It should be understood that FIGS. 2a and 2b (as do FIGS. 3 and 4) show cross sections. This means that the depicted indentations 18 may either be hemispheric, i.e. have the form of a concave hemisphere or spherical calotte, or may be cylindrical, extending rectangular to the paper plane.

The center of curvature of indentation 18 is the desired focal point 19 of incident beam 15 (or focal line in case of a cylindrical arrangement). This focal point will usually be located on the top of cantilever 10.

The effect of locating the desired focal point 19 of incident beam 15 to be commensurate with the center of curvature of the optical element is that incident beam 15 transmits the interface between optical element 11 and fluid 13 (FIG. 2b) essentially perpendicular. This in turn means that the beam path is practically independent of the refractive indices of optical element 11 and fluid 13, i.e. any change of the respective indices does not effect the focal point of the beam. In other words, fluid 13 may be replaced (even by a vacuum) at any time without needing a readjustment of the optical system. This will be explained in greater detail below.

Advantageously, the transparent optical element 11 may be horizontally somewhat inclined to avoid the trapping of gas bubbles inside of indentation 18. Such gas bubbles may exist or be generated within the liquid surrounding cantilever 10. The minimum inclination of optical element to achieve this effect depends on the size of the curvature: if the tangent to the curvature at the edge of the inner curved surface 18 is at least horizontal, any gas bubbles inside indentation 18 can and will escape.

Figure 3:
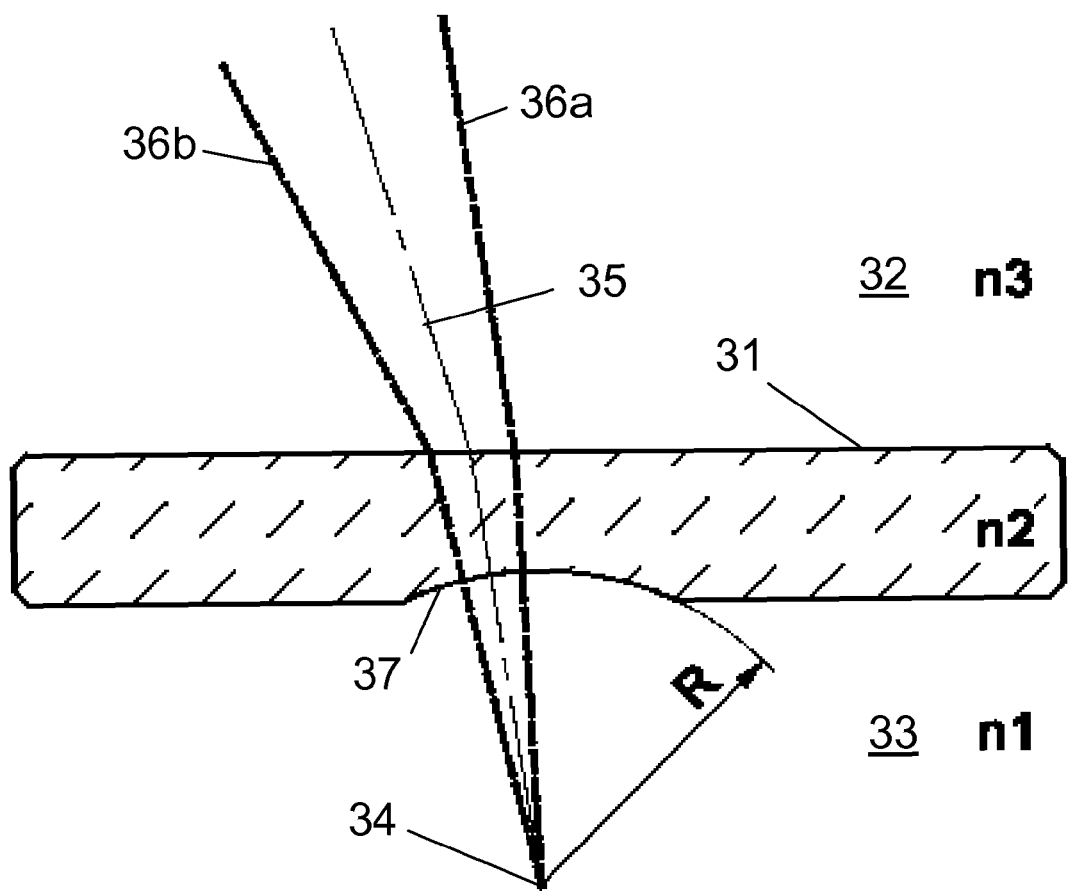
FIG. 3 is a detail view of a first embodiment of the optical element.

FIG. 3 shows a first embodiment of the invention as cross section in a simplified, schematic way.

An optical body 31, e.g. glass, with a refractive index $n_2$ separates the outer space 32, usually air or another gas or gas mixture with a refractive index $n_3$ from the inner space 33 of the probe chamber. Inner space 33 contains a fluid with a refractive index $n_1$. The refractive indices $n_i$ differ from each other; typically $n_1 < n_2$ and $n_3 < n_2$.

A laser or other light source (not shown) sends a light beam with the marginal rays 36a and 36b and a center ray 35 from somewhere in the vicinity outside FIG. 3.

The focus 34 of this beam is usually the upper side of an AFM cantilever as shown in FIGS. 1, 2a, and 2b (but not shown in FIG. 3). To achieve the desired effect, the optical body's inner surface, i.e. the surface adjacent to focal point 34 includes curvature 37. In other words, a lens is formed in the optical body 31. The radius of curvature 37 is R; R is centered at focus 34.

Please note that, in three dimensions, curvature 37 may have two basic forms, as mentioned above, depending on the desired pattern or form of focus. If an undistorted focal point is desired, the curvature 37 is a spherical segment or calotte, forming a concave spherical lens. If correction is needed in one dimension only, the curvature 37 may have the form of a cylinder, thus forming a concave cylinder lens.

With this design, it should be clear that the refractive index $n_1$ has no effect whatsoever on the deflection or focus of the light beam. The probe chamber may be filled with any fluid, or the fluids may even be changed between or during measurements, without the need for any re-adjustment of the light source or other parts of the optical system. The reason is that all rays of the beam pass the interface between the optical body 31 and the fluid 33 on a path perpendicular to this interface. Thus, any refraction at the lower surface of optical element 31 is avoided, independent of the various or varying refractive indices of the materials.

Figure 4:
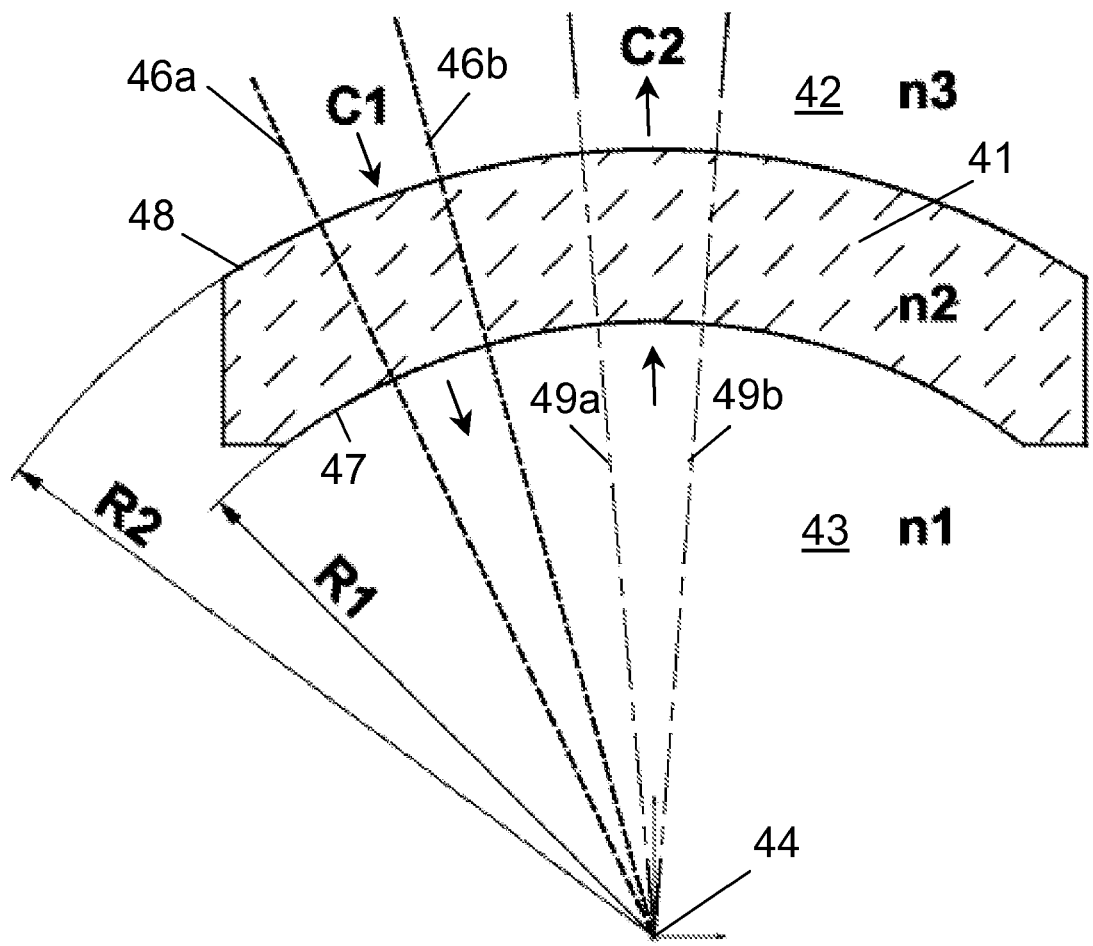
FIG. 4 is a detail view of a second embodiment of the optical element.

FIG. 4 shows another embodiment of the invention. This embodiment is advantageous if, for any reason, refraction at the optical element shall be minimized or completely avoided. Here, optical element 41 is designed as meniscus lens whose surfaces have a common center of curvature. This common center is the focal point 44 (or focal line in case of a cylindrical lens). Lower surface of lens 41 is designed with radius R1 centered at focal point 44 whereas the lens's upper surface 48 is designed with radius R2 centered at the same focal point 44. Obviously, the radii difference defines the thickness of meniscus lens 41.

Incident beam C1 with its marginal rays 46a and 46b passes through the curved upper surface 48 and the curved lower surface 47 of lens 41 perpendicularly. The same is true for the reflected beam C2 with its marginal rays 49a and 49b. Thus, there will be (practically) no refraction of the beams independent of differing refractive indices of the media. Neither refractive index $n_1$ of the fluid, often a liquid surrounding the sample (see FIG. 1), nor refractive index $n_2$ of the material of lens 41, nor refractive index $n_3$ of the fluid inside the instrument, respectively, will affect the beam paths. Thus, a basic, initial adjustment of the instrument will be practically sufficient for all measurements independent of changing temperatures, changing wavelength of light source, changing refractive index, and no readjustment whatsoever is necessary. In other words, the source of radiation itself or its color/wavelength may be changed without any re-adjustment of the SPM. Also, polychromatic sources may be used.

Further, measurements at different temperatures or over a temperature range are possible without re-adjustment or re-calibration.

Figure 5:
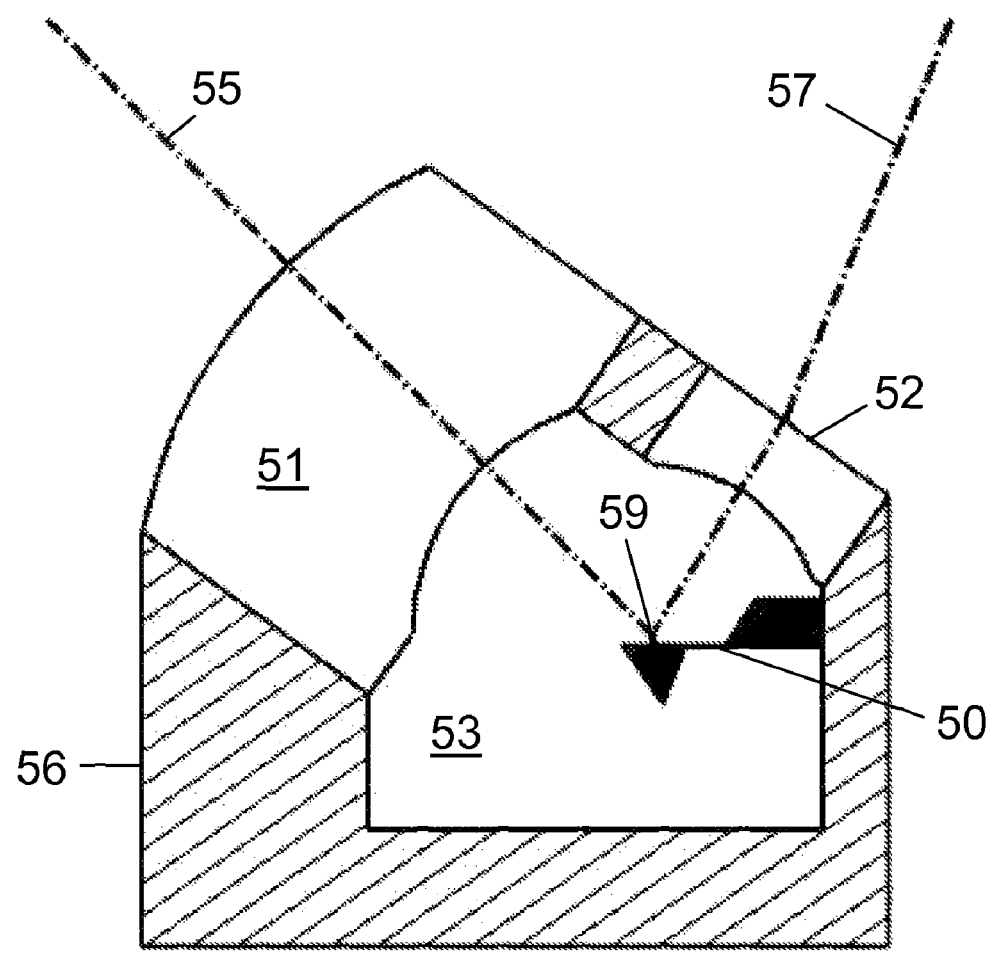
FIG. 5 is a further embodiment with separate optical elements.

FIG. 5 shows a further embodiment of a the invention, here with two separate optical elements: a meniscus lens 51 directing the incident beam 55 into probe chamber 56, focussing it onto focal point 59 (which may be a focal line, as explained above) on cantilever 50. Reflected beam 57 leaves probe chamber 56 via lens 52 which is shown as plane-concave lens. Probe chamber 56 is filled with a fluid 53.

Please note that incident and reflected beam may as well be reversed, i.e. that beam 57 is the incident beam and beam 55 the reflected beam. This is also true for the embodiments shown in FIGS. 2a, 2b, and 4.

Please note also that any of the cantilevers 10 or 50 does not necessarily need to have a tip (as shown in the drawings), but may be a sensing cantilever without tip in an "artificial nose", a calorimeter, or another sensing arrangement or array where not a sample is scanned, but any properties of the fluid 13 or 53, i.e the liquid, gel or gas, are measured. Also, there are applications where a coating on the cantilever is investigated under the presence of various fluids. Such applications include chemical or biological sensing probes like "artificial noses", gas detectors, etc.

The invention claimed is:

1. A raster scanning microscope, adapted for sensing the position and/or movement of a micromechanical cantilever immersed in a fluid, said microscope comprising:
    a source for generating a first beam of radiation incident on said cantilever,
    a receiver for receiving a second beam of radiation reflected from said cantilever, and
    a first transparent optical element between said fluid and said source and/or said receiver,
        said first transparent optical element being in contact with said fluid and allowing said first and/or second beam to pass from said source through said fluid onto said cantilever and being reflected therefrom onto said receiver,
        said first transparent optical element including, at its inner side and contacting said fluid, an inner curved surface whose center of curvature is located at a desired focal point of said first beam of radiation, so that, independent of the index of refraction of said fluid, said first beam remains focused on said cantilever and said second beam remains focused on said receiver, and
        said first transparent optical element being horizontally inclined so that the tangent to the curvature at one edge of the inner curved surface is at least horizontal, thus avoiding the trapping of gas bubbles at said inner curved surface.

2. The microscope according to claim 1, wherein a probe chamber is provided which contains the fluid and the immersed cantilever.

3. The microscope according to claim 2, wherein both the source and the receiver are located outside the probe chamber.

4. The microscope according to claim 2, wherein the first transparent optical element is located between the source and the cantilever and a second transparent optical element is located between the receiver and the cantilever.

5. The microscope according to claim 4, wherein both the first and second transparent optical elements are horizontally inclined so that the tangents to the curvature at one edge of their inner curved surfaces are at least horizontal, thus avoiding the trapping of gas bubbles at each of said transparent optical elements.

6. The microscope according to claim 1, wherein the cantilever is immersed in an unshackled drop of the fluid.

7. The microscope according to claim 1, wherein a sample is immersed in the fluid, said sample being scanned by the immersed cantilever.

8. The microscope according to claim 1, wherein the first transparent optical element includes a plane outer surface facing the source and/or the receiver.

9. The microscope according to claim 1, wherein the inner curved surface has the form of a spherical calotte whose center of curvature is located at a desired focal point of said first and/or second beam of radiation.

10. The microscope according to claim 1, wherein the inner curved surface has the form of a cylinder whose axis is located at a desired focal line of the first and/or second beam of radiation.

11. The microscope according to claim 1, wherein the desired focal point of the first beam of radiation is located on the cantilever.

12. The microscope according to claim 11, wherein a sample is immersed in the fluid, said sample being scanned by the immersed cantilever.

13. The microscope according to claim 1, wherein the first transparent optical element includes an outer curved surface facing the source and/or the receiver, the center of curvature of said outer surface being located at a desired focal point of the first and/or second beam of radiation.

14. The microscope according to claim 13, wherein a probe chamber is provided which contains the fluid and the immersed cantilever.

15. The microscope according to claim 14, wherein both the source and the receiver are located outside the probe chamber.

16. The microscope according to claim 14, wherein two transparent optical elements between the probe chamber and the source and/or the receiver are provided, one each for the first, incident beam and the second, reflected beam.

17. The microscope according to claim 13, wherein the cantilever is immersed in an unshackled drop of the fluid .

18. The microscope according to claim 13, wherein both the inner curved surface and the outer curved surface have the form of spherical calottes whose centers of curvature are located at a desired focal point of the first and/or second beam of radiation.

19. The microscope according to claim 13, wherein both the inner curved surface and the outer curved surface have the form of cylinders whose centers of curvature are located at a desired focal line of the first and/or second beam of radiation.

20. The microscope according to claim 13, wherein the desired focal point of the first, incident beam of radiation is located on the cantilever.

* * * * *